(12) United States Patent
Sternberger et al.

(10) Patent No.: US 7,000,952 B2
(45) Date of Patent: Feb. 21, 2006

(54) DUCT SEPARATION RESTRAINT APPARATUS AND METHOD

(75) Inventors: Joe E. Sternberger, Wichita, KS (US); Kevin L. Loss, Augusta, KS (US)

(73) Assignee: The Boeing Company, Chicago, IL (US)

( * ) Notice: Subject to any disclaimer, the term of this patent is extended or adjusted under 35 U.S.C. 154(b) by 26 days.

(21) Appl. No.: 10/445,994

(22) Filed: May 27, 2003

(65) Prior Publication Data

US 2004/0239103 A1 Dec. 2, 2004

(51) Int. Cl.
*F16L 55/00* (2006.01)

(52) U.S. Cl. .......................... 285/1; 285/117; 285/924; 285/114

(58) Field of Classification Search ................ 285/117, 285/924, 1, 114, 81
See application file for complete search history.

(56) References Cited

U.S. PATENT DOCUMENTS

| | | | | | |
|---|---|---|---|---|---|
| 162,169 | A | * | 4/1875 | Hopkins | 137/349 |
| 875,844 | A | * | 1/1908 | Peacock | 285/114 |
| 924,840 | A | * | 6/1909 | Schmidt | 285/334.2 |
| 1,093,868 | A | * | 4/1914 | Leighty | 285/334.1 |
| 1,839,690 | A | * | 1/1932 | Malinowski | 285/2 |
| 1,939,936 | A | * | 12/1933 | Walker et al. | 285/117 |
| 1,966,038 | A | * | 7/1934 | Muchnic | 285/135.5 |
| 3,574,862 | A | * | 4/1971 | Jones | 2/2.15 |
| 4,969,923 | A | * | 11/1990 | Reeder et al. | 285/365 |
| 5,096,377 | A | * | 3/1992 | Catte et al. | 415/182.1 |
| 5,454,606 | A | * | 10/1995 | Voss et al. | 285/367 |
| 5,470,114 | A | * | 11/1995 | Umney et al. | 285/367 |
| 5,772,258 | A | * | 6/1998 | Dyer et al. | 285/114 |
| 5,899,507 | A | * | 5/1999 | Schroeder et al. | 285/343 |
| 5,988,705 | A | * | 11/1999 | Norkey | 285/319 |
| 6,003,814 | A | | 12/1999 | Pike et al. | |
| 2003/0122377 | A1 | * | 7/2003 | Northrop et al. | 285/363 |

* cited by examiner

*Primary Examiner*—Eric K. Nicholson
(74) *Attorney, Agent, or Firm*—Harness Dickey & Pierce P.L.C.

(57) ABSTRACT

A coupling apparatus and method for coupling two duct sections together to form a joint therebetween. The apparatus includes a catcher ring component formed coextensive with the edge of one section of duct, and a catcher finger component formed coextensive with an edge of the other section of duct being coupled to form the joint. The catcher finger component includes a catcher finger which is longitudinally aligned with a flange of the catcher ring, and that protrudes inwardly into its associated section of duct. In the event of a failure of a main clamping assembly disposed over an outer periphery of the two duct sections at the joint, the catcher finger and flange engage to limit separation of the two sections of duct to only a controlled, limited degree. This protects other subassemblies and components positioned closely adjacent the duct from any damage that might result from separation of the two duct sections, including exposure to high temperature and pressurized air.

17 Claims, 5 Drawing Sheets

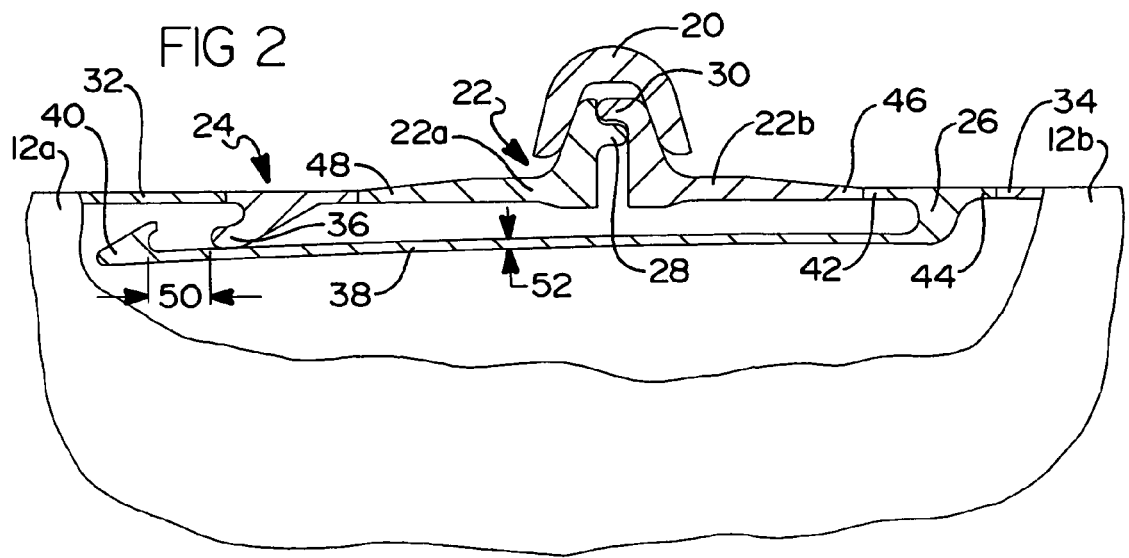
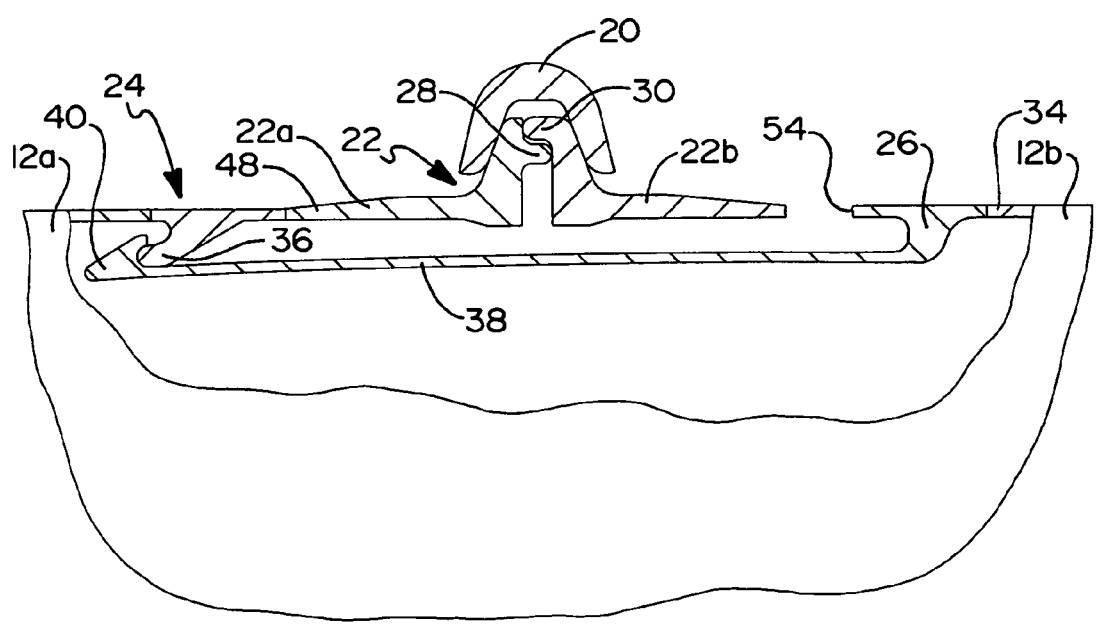

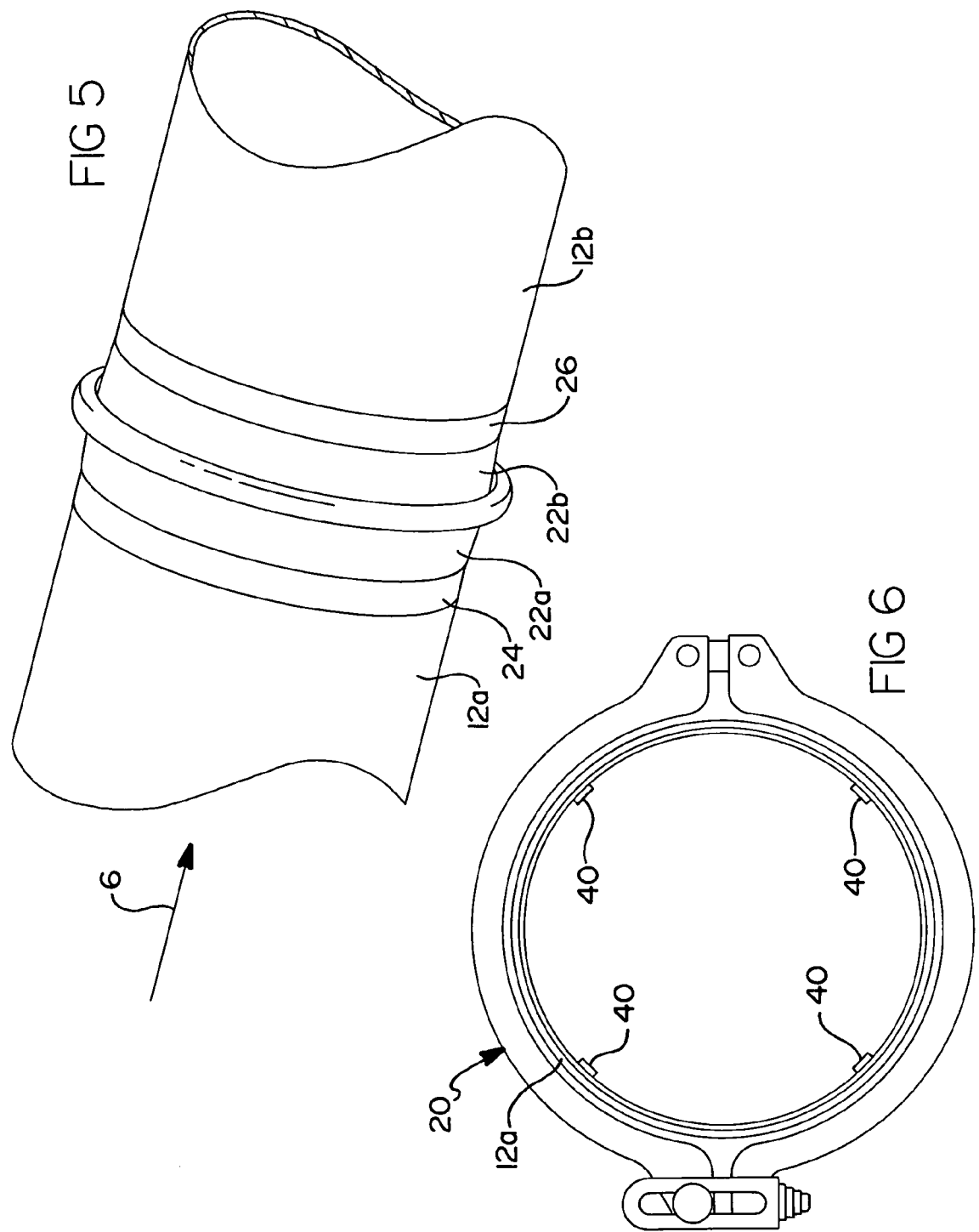

US 7,000,952 B2

DUCT SEPARATION RESTRAINT APPARATUS AND METHOD

FIELD OF THE INVENTION

The present invention relates to restraint systems, and more particularly to a duct separation restraint apparatus and method for controlling the separation of a pair of joined ducts in the event of a failure of a clamp system securing the ducts together.

BACKGROUND OF THE INVENTION

Various systems are presently in use to assist in securing the mating edges of a pair of ducts together to form a joint between the pair of ducts. One such application is in commercial aircraft construction where an AS1895 clamp and AS1895 (Aerospace Standard) clamp ring are used to join a pair of ducts that are being used to provide fluid pressure to a pneumatic subsystem of the aircraft. In such an application, failure of the AS1895 clamp or the AS1895 clamp ring would allow the joined edges of a pair of ducts to separate to a significant degree, resulting in a core cavity pressure spike. Another detriment in such an event is that surrounding structure is exposed to high temperature pneumatic air. Aircraft designers must compensate for this rare event by adding material to the various portions of the aircraft (typically cowling or fairing structures) that are closely adjacent the joined areas of duct work being used to supply pressurized air to an aircraft subsystem. As a result, aircraft designers address the rare event of joint failure of a pneumatic duct by increasing the material thickness of the aircraft component (e.g., fairing, cowling, etc.) to a sufficient degree such that damage to the aircraft component will not result if a joint failure of the pressurized duct occurs. As will be appreciated, the use of materials having additional thicknesses can add appreciably to the cost and overall weight of a commercial aircraft.

Accordingly, there exists a need for a coupling apparatus that can be used to couple the ends of a pair of ducts of a pressurized duct assembly, and which assists in maintaining the joined ends of the duct in close proximity to one another in the rare event of a failure of a primary clamp assembly being used to hold the ends of the two ducts in joined relation. Such an apparatus and method would ideally be integratable with an existing AS1895 clamp and AS 1895 clamp ring in a manner that does not materially complicate the overall joint construction nor complicate the assembly of the overall duct. Still further, such an apparatus and method would ideally permit a controlled degree of separation of the ends of the two ducts being joined in the rare event of a failure of the primary clamp joining the ducts, to thus allow external sensors to be used to detect that the joint has failed. Such a controlled degree of separation, however, would limit resulting peak core cavity pressure and ensure that the previously joined ends of the duct do not come into contact with any other panels or components of the aircraft.

SUMMARY OF THE INVENTION

The present invention is directed to a coupling apparatus and method for coupling the free edges of a pair of ducts together to form a joint, and further in a manner that allows only a limited, controlled degree of separation of the free edges in the event of a failure of the joint. In one preferred form the apparatus includes a catcher ring component that is secured to one duct and a catcher finger component that is secured to the other duct. The catcher finger component includes an elongated member that extends toward the one duct so as to be disposed closely adjacent a portion of the catcher ring component. In the rare event of a failure of the external clamp, which would normally cause a significant degree of separation of the edges of the ducts, the catcher finger engages with the portion of the catcher ring component to limit separation of the ducts in a controlled manner to a predetermined, limited degree. This controlled degree of separation prevents the edges of the ducts from impacting or otherwise interfering with other subassemblies, panels, components, etc., in the rare event of a failure of the external clamp.

The present invention, while not limited to aircraft and aerospace applications, is nevertheless ideally suited for use with joints formed along long lengths of ducting often employed in aircraft and spacecraft. In commercial aircraft applications the coupling apparatus of the present invention limits separation of the two ducts to a predetermined, limited degree. This significantly reduces or eliminates core cavity pressure surge and the possibility of one or both of the separated edges of a previously joined section of duct from contacting aircraft cowling, fairing, or other structural panels or subassemblies located in the vicinity of the duct, if separation of the two sections of the duct occurs.

In one preferred form, the coupling apparatus of the present invention is integrally formed with an AS 1895 clamp ring, and the two sections of duct are secured via an AS1895 clamp. The coupling apparatus does not significantly complicate the design, assembly or disassembly of the two sections of duct. It further does not add appreciably to the overall cost of the ducting or to the weight associated with the ducting, and is retrofittable to existing ducting.

BRIEF DESCRIPTION OF THE DRAWINGS

The present invention will become more fully understood from the detailed description and the accompanying drawings, wherein:

FIG. 2 is a side view of a portion of the duct of FIG. 1 with a portion thereof broken away to better illustrate the coupling apparatus in accordance with a preferred embodiment of the present invention;

FIG. 5 is an elevational perspective view of the two ducts of FIG. 4 joined together, but omitting the AS1895 clamp;

FIG. 6 is an end view of the duct of FIG. 5, taken in accordance with directional arrow 6 in FIG. 5, with the AS1895 clamp portion installed at the joint of the two ducts; and FIG. 7 is a cross sectional side view of the assembled duct with a break to illustrate how the coupling apparatus limits separation of the two duct sections to only a controlled degree.

DETAILED DESCRIPTION OF THE PREFERRED EMBODIMENTS

The following description of the preferred embodiment(s) is merely exemplary in nature and is in no way intended to limit the invention, its application, or uses.

Figure 1:
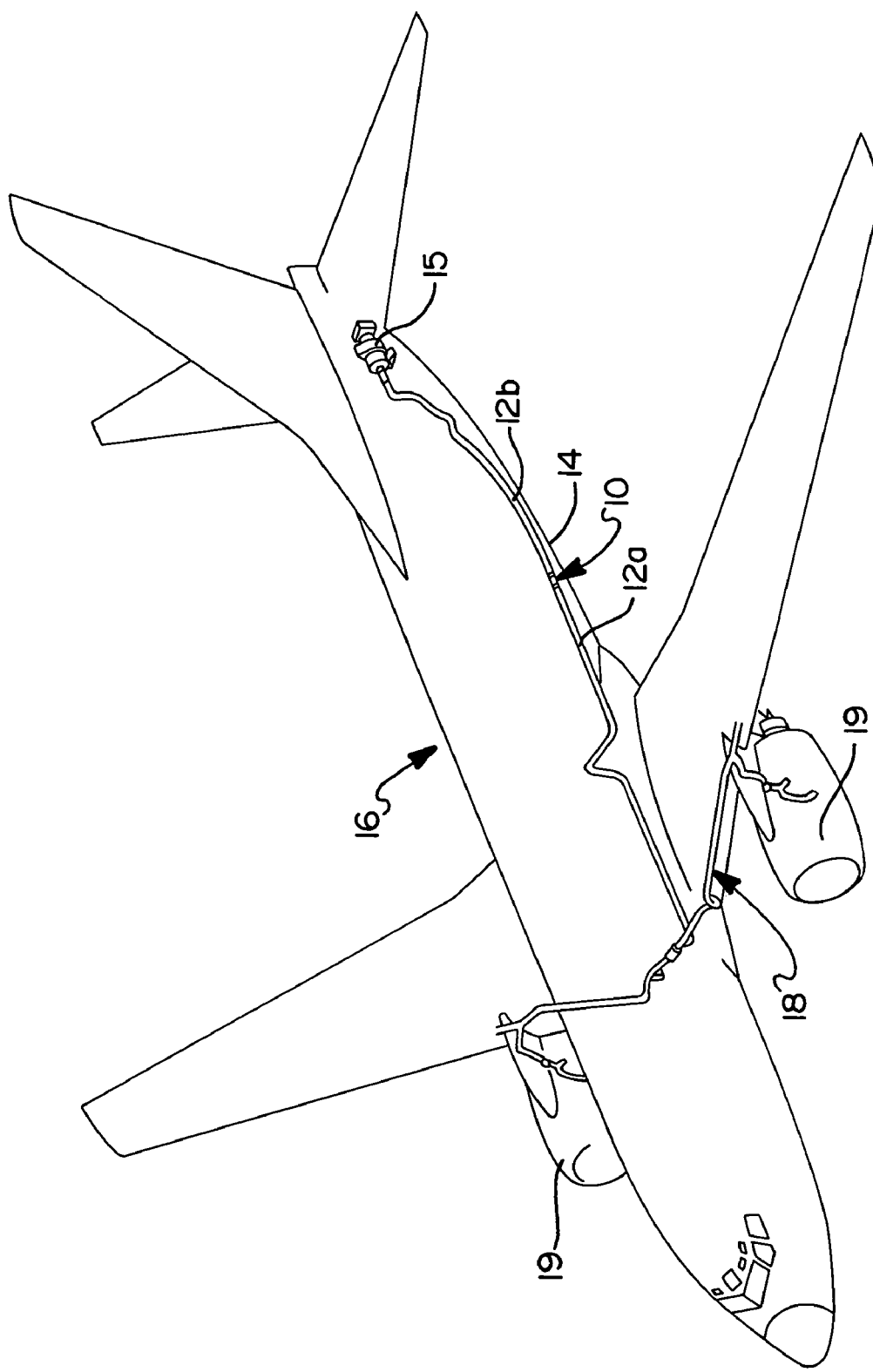
FIG. 1 is a perspective view of a commercial aircraft incorporating a coupling assembly in accordance with a preferred embodiment of the present invention.

Referring to FIG. 1, there is shown a clamp apparatus 10 being used in connection with a duct 12 having sections 12a and 12b. The duct 12 is shown disposed closely adjacent a fairing 14 of a commercial aircraft 16. The duct 12 forms a bleed air duct for an auxiliary power unit 15 (APU) which carries pressurized air from the APU. Similar ducting 18 is used to channel engine bleed air from engines disposed within nacelles 19. However, it will be appreciated immediately that the apparatus 10 of the present invention is not limited only to ducting employed in aircraft applications, but rather to any form of duct wherein it would be highly desirable to control the separation of the joined portions of the duct to a limited degree in the event of separation of the two joined sections of the duct. Thus, the apparatus 10 will find utility in a wide plurality of applications and machinery, where pressurized fluids are used to control various forms of subassemblies or to channel pressurized fluids. The reference to commercial aircraft 16, therefore, will be understood as being merely for exemplary purposes.

As will be described in greater detail in the following paragraphs, the coupling apparatus 10 forms an apparatus that allows a controlled degree of separation of the two duct sections 12a and 12b so that in the event of a separation of the two sections 12a, 12b from one another, such separation will not cause either section to come in contact with any other subassembly or panel disposed closely adjacent the duct 12, or will at least limit such contact to a controlled degree. The practical advantage of this feature is that various panels used on aircraft, such as in connection with the cowling or the fairing of the aircraft, can be made with a lesser thickness, and therefore be made lighter and less expensively because of the reduced core cavity pressure and the elimination of the likelihood of contact, or the degree of contact, with one of the duct sections 12a, 12b in the rare event of separation of the sections from one another.

Figure 3:
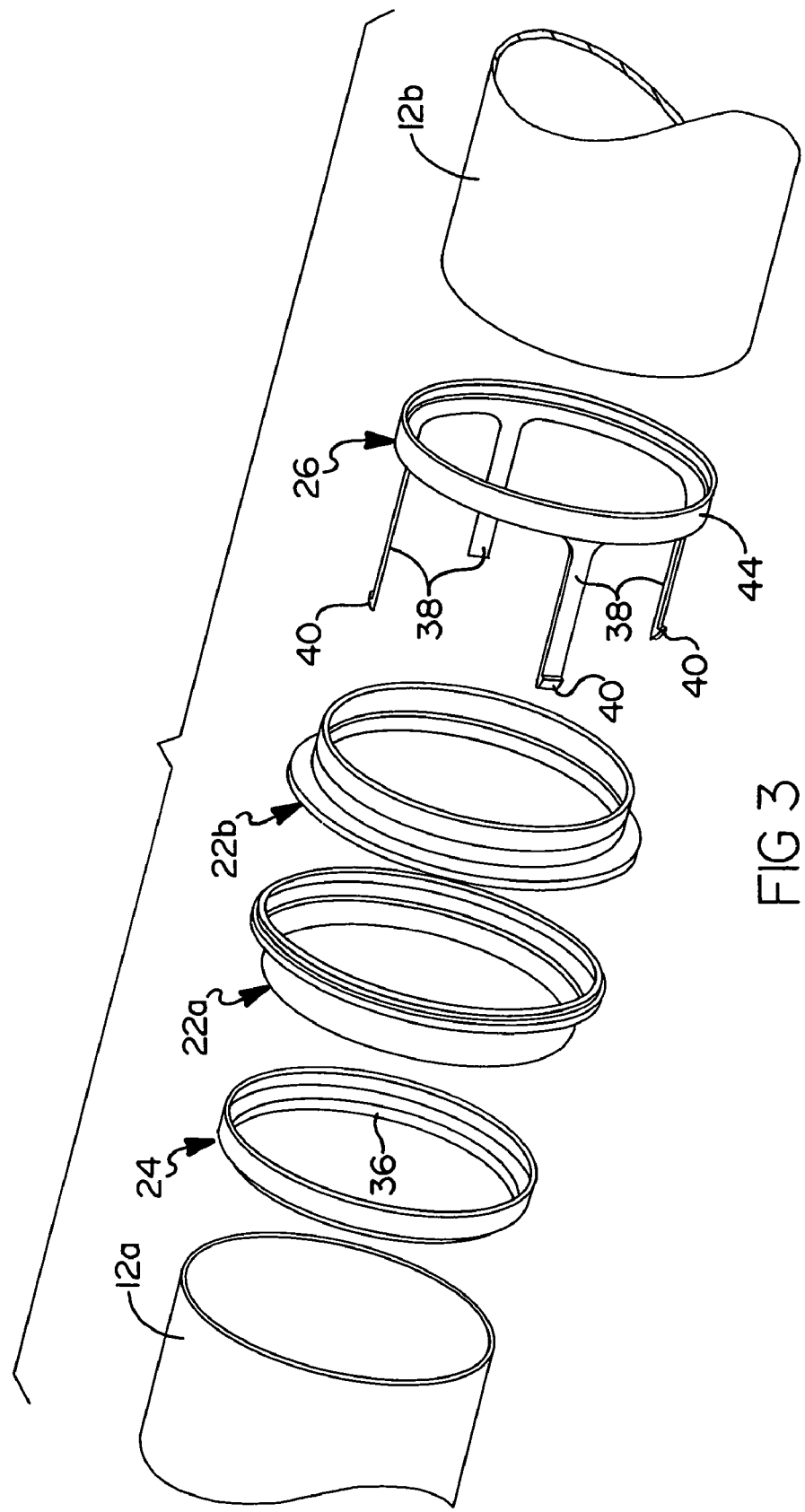
FIG. 3 is an exploded perspective view of certain of the components of the clamping apparatus of FIG. 2.

Referring now to FIGS. 2 and 3, the components and construction of the coupling apparatus 10 can be seen in even greater detail. The apparatus 10 includes a circumferential clamp component 20, which may be formed in accordance with a well known AS1895 clamp, a clamp ring assembly 22 comprised of clamp rings 22a and 22b, a circumferential catcher ring component 24 and a circumferential catcher finger component 26. Clamp rings 22 and 22b include projecting portions 28 and 30, respectively, which are positioned in close overlaying relationship with one another when free ends 32 and 34 of the ducts 12a and 12b, respectively, are positioned in longitudinal alignment with one another to form a joint therebetween. Catcher ring component 24 comprises a circumferential ring having a flange or shoulder 36, and catcher finger component 26 includes a catcher finger 38 extending longitudinally generally parallel to a longitudinal axis of the duct 12. The catcher finger 38 includes a hook portion 40 at its terminal end that is adapted to engage with flange 36 in the event of separation of the duct sections 12a and 12b.

With further reference to FIGS. 2 and 3, catcher ring 24 and catcher finger component 26 are each preferably formed from titanium, steel or any other suitably strong, lightweight material. Catcher finger component 26 includes edge portions 42 and 44 that are welded, brazed or otherwise suitably secured to an edge portion 46 of the clamp ring 22b and to the free edge 34 of duct 12b, respectively. Thus, the catcher finger component 26 essentially forms an integral component of the clamp ring 22b and the duct section 12b.

Figure 4:
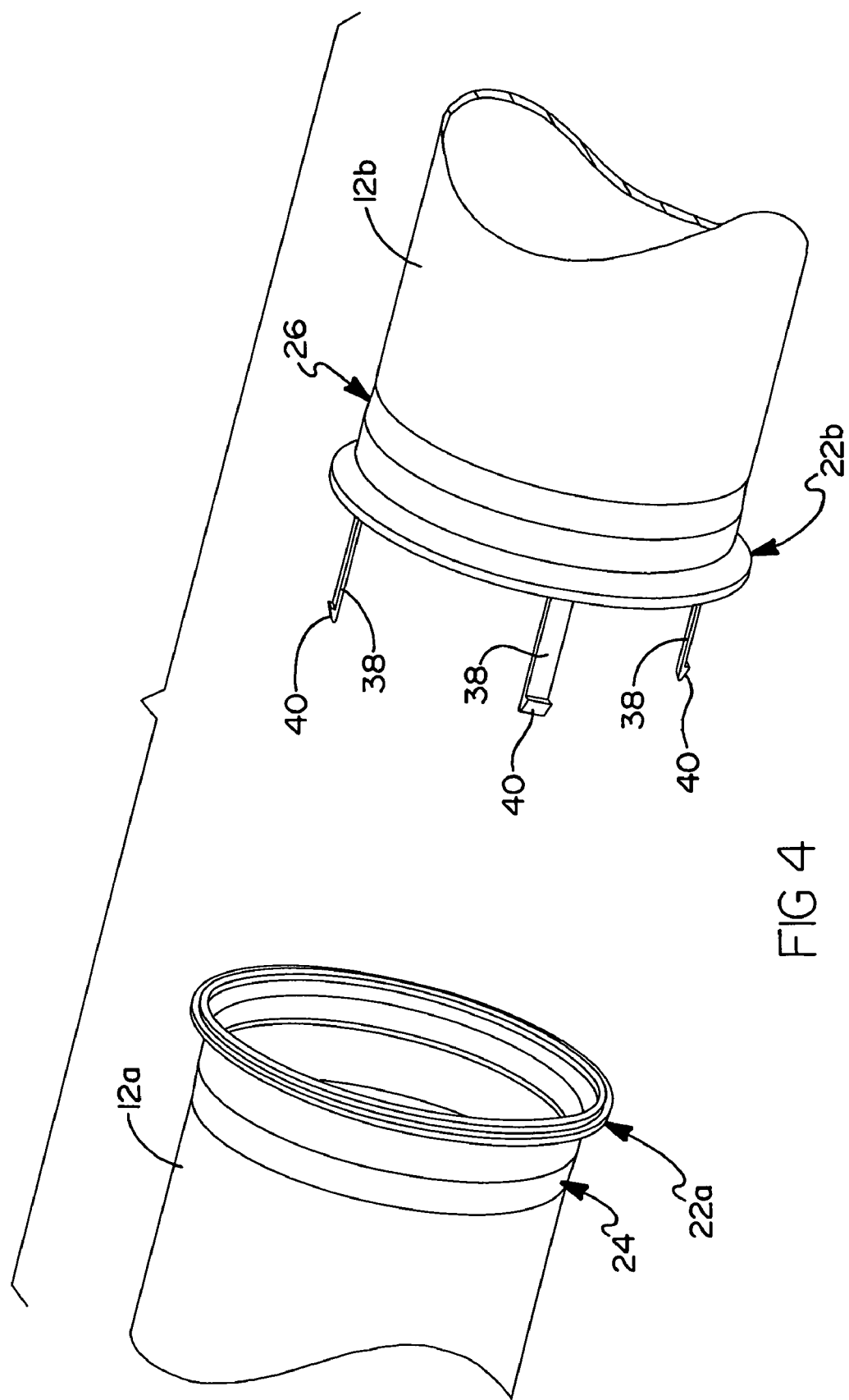
FIG. 4 is a perspective view of the components shown in FIG. 3 secured to the free ends of a pair of ducts that are to be joined together.

With further reference to FIGS. 2–4, the catcher ring component 24 is similarly welded or brazed to edge 32 of duct 12a as well as edge 48 of clamp ring 22a. Thus, the catcher ring component 24 forms an integral portion of the duct 12a and the clamp ring 22a. From FIG. 2, it will be noted that the flange 36 projects inwardly into duct section 12a so as to be generally longitudinally aligned with the hook portion 40 of the catcher finger 38. The spacing between the flange 36 and the hook portion 40, which is designated by arrow 50, may vary considerably, but is preferably within the range of between about 0.08–0.12 inch (2 mm–3 mm). It has been determined that this amount of clearance between the flange 36 and the hook portion 40 allows only a small, limited degree of separation between the duct sections 12a and 12b in the event of a failure of either the clamp 20 or either one of the clamp rings 22a or 22b. Thus, in the rare event of such a failure, a portion of the pressurized fluid within the duct 12 escapes and can be quickly detected by suitable sensors disposed externally of the duct 12 closely adjacent to the duct, while peak surge pressure is reduced and physical contact of either one of the duct sections 12a or 12b with adjacent structure or subassemblies is eliminated or controlled.

It will be appreciated that while hook portion 40 has been described as being separated by distance 50 from the flange portion 36, that the hook portion could be formed such that it engages the flange 36 as soon as clamp rings 22a and 22b are urged into abutting engagement. This would prevent any separation of the duct sections 12a and 12b in the event of a failure of the clamp 20 or either of the clamp rings 22a or 22b. Still further, the hook portion 40 could be shaped in such a manner as to allow a limited degree of radial displacement of the duct sections 12a and 12b in the event of a failure of either the clamp 20 or the clamp rings 22a or 22b. It will thus be appreciated that a number of modifications could be made to either the hook portion 40 or the flange 36 to achieve controlled degrees of radial and/or longitudinal separation of the duct sections 12a and 12b, or virtually no separation of the duct sections, in the rare event of a failure of the clamp 20 or either of the clamp rings 22a.

Referring briefly to FIG. 5, the clamp rings 22a and 22b can be seen in close, abutting relationship with one another. Also, it can be seen that the catcher ring 24 and the catcher finger component 26 form generally coextensive portions of the duct sections 12a and 12b. It is an advantage of the coupling apparatus 10 that the apparatus does not add to the bulk or overall dimension of the duct 12 beyond what would be needed to implement a conventional AS1895 clamp and AS1895 clamp ring.

Referring now to FIG. 4 and FIG. 6, the number of finger components 38 employed may vary from a single finger component 38 to a plurality of finger components, as is visible in FIGS. 4 and 6. It is anticipated that in many commercial aircraft applications, preferably three to six such finger components 28 will be most advantageous. However, it will be appreciated that as the diameter of the duct 12 increases, typically an increasing number of catcher fingers 38 will be preferred. The four finger components 38 illustrated in FIGS. 4 and 6 are merely meant to illustrate that a plurality of such components will more typically be incorporated rather than just a single catcher finger 38. If a plurality is incorporated, then it is further preferred that the catcher fingers 38 be spaced apart evenly about the circumference of the duct section 12b. Each of the finger components 38 further has a thickness, designated by arrows 52 in FIG. 2, in the range of about 0.04 inch–0.10 inch (1 mm–2.5 mm), and more preferably about 0.05 inch (1.25 mm), to impart a small degree of flexibility to the catcher finger 38. This degree of flexibility is preferred to allow the portion 40 to readily slide over the flange 36 when the two duct sections 12a and 12b are brought into longitudinal alignment with one another just prior to securing the clamp 20 over the clamp rings 22 and 22b.

Referring briefly to FIG. 7, the duct 12 can be seen with a break 54. As can be seen, the hook portion 40 engages with the FIG. 36 of the catcher ring 24 to limit separation of the duct sections 12a and 12b to a controlled distance.

From the foregoing, it will be appreciated then that the coupling apparatus 10 and the method of coupling implemented by the apparatus is ideally suited for sections of ducting that need to be joined together, and particularly where only a small, controlled degree of duct separation is desired in the event of a failure of the joint formed between the two duct sections. The coupling apparatus 10 and method of the present invention does not add significantly to the complexity of the overall joint formed between two duct sections, does not appreciably add to the weight of the duct or to the complexity in constructing a joint between two duct sections, or in assembling such a joint. The controlled degree of separation provided by the coupling apparatus 10 of the present invention allows structural panels disposed closely adjacent the coupling apparatus to be made with even thinner and lighter materials that do not necessarily need to withstand higher failed duct pressure or the impact from one of the duct sections 12a and 12b in the rare event of a failure of the clamp 20 or clamp rings 22a and 22b of the apparatus.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coupling apparatus for coupling the ends of a pair of ducts carrying a flowing fluid, said apparatus comprising:
   a circumferential clamp ring assembly having first and second clamp rings adapted to be secured in abutting contact;
   a catcher finger component adapted to be fixedly secured to a free edge of a first one of said ducts and fixedly to a first edge of a first one of said clamp rings, said catcher finger component including at least one catcher finger projecting away from said free edge of said first one of said ducts and generally co-axially with said first one of said ducts; and
   a catcher ring component adapted to be fixedly secured to a free edge of a second one of said ducts and to a first edge of a said second one of said clamp rings, said catcher ring component including a portion spaced apart from said catcher finger by a predetermined distance when said coupling apparatus is assembled to said ducts and being adapted to engage with said catcher finger in the event of a failure of a joint formed between said first and second clamp rings, to allow only a controlled degree of separation of said first and second ducts from one another in accordance with said predetermined distance, which separation is sufficient to allow detection of said fluid flowing within said ducts by an external sensor.

2. The apparatus of claim 1, wherein said catcher finger component comprises a circumferential component having a flange, said flange having a plurality of catcher fingers spaced radially therearound.

3. The apparatus of claim 1, wherein said catcher ring component comprises a circumferential component having a circumferential lip extending about at least a substantial portion thereof.

4. The apparatus of claim 1, wherein said lip extends around an entire circumference of said catcher ring component.

5. The apparatus of claim 1, wherein said catcher finger comprises a hook shaped end portion for engaging with said portion of said catcher ring component.

6. The apparatus of claim 1, wherein said portion of said catcher ring component comprises a flange.

7. The apparatus of claim 6, wherein said flange extends circumferentially about at least a substantial portion of a circumference of said catcher ring component.

8. The apparatus of claim 7, wherein said flange is formed to project away from said second one of said clamp rings.

9. A coupling apparatus for coupling the ends of a pair of ducts carrying a flowing fluid, said apparatus comprising:
   a circumferential clamp ring assembly having first and second clamp rings adapted to be secured in abutting contact;
   an outer clamp ring assembly adapted to be secured over portions of said first and second clamp rings to hold said first and second clamp rings in abutting contact;
   a first catcher member adapted to be fixedly secured to a free edge of a first one of said ducts and fixedly to a first edge of said first clamp ring, said first catcher member including at least one axially extending, flexible catcher finger projecting away from said free edge of said first one of said ducts and generally co-axially with said first one of said ducts; and
   a second catcher member adapted to be fixedly secured to a free edge of a second one of said ducts and to said second clamp ring, said second catcher member including a portion spaced apart from said catcher finger by a predetermined distance, and being adapted to engage with said catcher finger in the event of malfunction of one of said circumferential clamp ring assembly and said outer clamp ring assembly to allow a controlled degree of separation of said first and second ducts from one another, in accordance with said predetermined distance, after failure of either one of said circumferential clamp ring assembly and said outer clamp ring assembly; and
   wherein said first and second catcher members are disposed so as to reside within said pair of ducts when said ducts are assembled together.

10. The apparatus of claim 9, wherein said first catcher member comprises a circumferential component including a flange, said flange having a plurality of catcher fingers spaced circumferentially there around and extending axially from the flange so as to project generally toward said free edge of said second duct.

11. The apparatus of claim 10, wherein said catcher finger includes a hook-shaped end portion for engaging said portion of said second catcher member.

12. The apparatus of claim 9, wherein said second catcher member comprises a circumferential ring having a lip, said lip being shaped so as to be engage able with said catcher finger in the event of said malfunction of one of said circumferential ring assembly and said outer clamp ring assembly.

13. The apparatus of claim 12, wherein said lip extends entirely around a circumference of said circumferential ring.

14. A method for securing edges of first and second pressurized fluid carrying ducts together, comprising:

fixedly securing a catcher finger component to a first one of said ducts to form an integral portion of said first one of said ducts, forming the catcher finger component to include at least one flexible catcher finger extending generally co-axially with, and radially inwardly of, said first one of said ducts;

fixedly securing a catcher ring component to a second one of said ducts to form an integral portion of said second one of said ducts;

forming said catcher ring component with a flange portion projecting radially inwardly, relative to said second one of said ducts;

securing said first and second ducts in longitudinal alignment such that a joint is effectively formed between free edges of said ducts;

forming said flexible catcher finger with an axial length such that said catcher ring and said flexible catcher finger are spaced apart by a predetermined distance when said ducts are coupled together so that a predetermined degree of axial separation is allowed between said ducts in the event of a failure of an external clamping element securing said two ducts together; and disposing said portion of said catcher ring, and also said flexible catcher finger, to extend within said ducts.

15. The method of claim 14, further comprising:

forming said catcher finger component to include a plurality of flexible catcher fingers.

16. The method of claim 14, further comprising forming said catcher ring component as a circumferential component with said portion forming a flange extending about at least a substantial portion of a circumference thereof.

17. The method of claim 14, further including securing a pair of clamp rings to portions of said catcher ring component and said catcher finger component, and urging said clamp rings into abutting engagement during said securing step to assist in forming said joint.

\* \* \* \* \*